United States Patent [19]

Peppers et al.

[11] Patent Number: 4,862,511
[45] Date of Patent: Aug. 29, 1989

[54] LOCAL FEATURE ANALYSIS APPARATUS

[75] Inventors: Norman A. Peppers, Belmont; James R. Young, Palo Alto; Gerald A. Pierce, Redwood City, all of Calif.; Kazuo Katsuki, Dosho, Japan; Kazuo Katsuki, Osaka, Japan

[73] Assignee: Nippon Sheet Glass Co., Ltd., Osaka, Japan

[21] Appl. No.: 62,485

[22] Filed: Jun. 15, 1987

[51] Int. Cl.⁴ .............................................. G06K 9/74
[52] U.S. Cl. ...................................... 382/32; 382/31; 350/162.13
[58] Field of Search ............... 382/31, 32; 350/162.13, 350/376

[56] References Cited

U.S. PATENT DOCUMENTS

| | | | |
|---|---|---|---|
| 3,248,552 | 4/1966 | Bryan | 382/32 |
| 3,252,140 | 5/1966 | Lemay et al. | 382/32 |
| 3,267,430 | 8/1966 | Howard | 382/32 |
| 3,274,550 | 9/1966 | Klein | 382/32 |
| 3,461,301 | 8/1969 | Fitzmaurice et al. | 382/32 |
| 3,550,119 | 12/1970 | Rabinow | 382/32 |
| 3,965,299 | 6/1976 | Lin | 350/376 |
| 4,573,198 | 2/1986 | Anderson | 350/162.13 |

OTHER PUBLICATIONS

Hirsch et al, "Character Reader," IBM Technical Disclosure Bulletin, vol. 14, No. 9, Feb. 1972, p. 2590.
Craig et al, "Bubble Domain Electronic-to-Optical Image Transducer," IBM Technical Disclosure Bulletin, vol. 13, No. 1, Jun. 1970, pp. 147–148.

Primary Examiner—Leo H. Boudreau
Assistant Examiner—Donald J. Daley
Attorney, Agent, or Firm—Woodcock Washburn Kurtz Mackiewicz & Norris

[57] ABSTRACT

In an apparatus for analyzing local features of a character or any other figures, an extraction of the local features is performed by correlation calculations using a plurality of first reference masks, an analysis associated with combinations of the extracted local feature is performed by pattern matchings using a plurality of second reference masks, and the extraction and the analysis are performed optically and simultaneously with respect to the plurality of reference masks, respectively. Therefore, the local features analysis can be performed at high speed and accurately.

8 Claims, 5 Drawing Sheets

LOCAL FEATURE ANALYSIS APPARATUS

BACKGROUND OF THE INVENTION

1. Field of the Invention

The present invention relates to an apparatus for simultaneously extracting local features of an image such as a character or any other figure and serially discriminating the degree of similarity between the image and a reference image, the apparatus being suitably used in an image recognition apparatus such as an OCR (Optical Character Reader).

2. Description of the Prior Art

A conventional image recognition apparatus for recognizing an image such as a character and any other figure is designed to perform processing utilizing mainly electronic techniques. Such an image recognition apparatus utilizes a bottom-up type technique wherein an input image is recognized on the basis of global feature extraction information obtained by an structural analysis.

A conventional image recognition apparatus will be briefly described. An image (input image) pattern subjected to image recognition and written on an original by printing or the like is focused by an optical lens on a light-receiving surface of an image sensor comprising a CCD or a MOS sensor. A digital signal as image information is output from the image sensor and is binarized by a proper threshold value (if there are multiple threshold values, multi-value conversion different from that described above is performed). The binarized signal is stored in a memory. The binarized image information is subjected to preprocessing for shaping the image, as needed. The preprocessed image information is stored in the above memory or another memory. Preprocessing includes noise reduction processing, normalization processing for positions, sizes, inclinations, and widths, and the like.

A feature extraction required for discriminating an image is performed over the image information stored in the memory. A projection feature extraction method is used as one of techniques for extracting features. These projection features are extracted by a feature-processing section.

In order to extract features of an image on a given axis (e.g., the X-axis), the memory which stores the image information is scanned in a direction (e.g., the Y-axis) having a predetermined relationship with the given axis, and the image information is read out time-serially or parallel-time-serially. The readout image information is transferred to the feature-processing section. Pieces of the transferred image information are sequentially measured by the feature-processing section. Measured values sequentially obtained by such measurements are stored at predetermined positions corresponding to the given axis in the memory or another memory. A curve of an intensity distribution obtained by extracting features on the given axis is calculated on the basis of the stored measured values.

In recognition processing (to be described later) or the like, feature extraction along one axis is not sufficient in order to improve reliability of similarity discrimination if a pattern is a two-dimensional pattern such as an image. For this reason, feature extraction of single image information must be performed on a large number of axes, thereby extracting various types of features. In order to extract features on a large number of axes, one of the following procedures is required:

(1) The above-mentioned feature extraction is repeated in a single feature-processing section; or (2) A large number of feature-processing sections are arranged and at the same time, pieces of image information read out from the memories are respectively transferred to the feature-processing sections. The above-mentioned feature extraction operations are simultaneously performed in the large number of feature-processing sections.

Class selection (class classification) is performed to discriminate that an input image of interest belongs to which class according to data of a large number of intensity distribution curves concerning the input image. This class classification is achieved by time-serial digital correlation calculations between the data of various types of intensity distribution curves concerning an input image and data of the intensity distribution curves of various types of reference patterns prestored in a dictionary for class classification. Therefore, the class to which the input image belongs can be discriminated by the reference pattern giving a maximum correlation with the input image pattern.

Individual recognition processing is performed for an image group belonging to a selected class on the basis of the similarity recognition results. This recognition processing is performed by individual digital correlation calculations between data of the intensity distribution curve concerning the reference pattern of the image group stored in a recognition dictionary and data of the intensity distribution curve concerning the input image in the same manner as in class classification.

A large number of digital accumulated values constituting the intensity distribution curves are respectively corresponded to vector components, and each intensity distribution curve is dealt as one vector. A total of intensity distribution curves is dealt as a set of vectors. In this case, the set of intensity distribution curves may be dealt as a single vector, and the individual digital accumulated values of each intensity distribution curve are corresponded to vector components constituting the single vector.

In the same manner as described above, each intensity distribution curve of the reference pattern can also be defined in the form of vector.

A special-purpose machinery incorporated in the image recognition apparatus digitally and time-serially calculates correlations between the input image vectors and reference pattern vectors. The special-purpose machinery may be a vector calculator practically used in a conventional parallel pipeline type computer.

In the correlation calculations between the input image vectors and the reference pattern vectors, a distance and an angle between the vectors can be used as factors for evaluating the degree of correlation therebetween. In practice, the distance between the vectors is used as a measure for the degree of deviation, and the cosine of the angle is used as a measure for the degree of similarity.

Variations in input image patterns are present due to a variety of expression formats of the original image, and the input image constitutes a cluster. Positional errors also occur in the input image. For this reason, the reference point of the intensity distribution of the input image does not normally match with that of the reference pattern. Therefore, in vector correlation calculations, an optimal correlation must be found to match the reference point of the input pattern with that of the reference pattern.

Optimal correlation between the input image vector and the reference pattern vector can be obtained by shifting both vectors and repeating the vector correlation calculations according to time-serial digital processing for every shift.

The above-mentioned vector correlation calculation processing allows discrimination of a reference pattern having a higher degree of similarity to the input image, i.e., the most resemble reference pattern.

As described above, expression formats of the original images to be recognized vary to present various patterns of identical images. If an image comprises, for example, characters, they include printed characters having uniform styles of penmanship as well as handwritten characters, thus presenting a variety of styles of character patterns. In particular, the forms of handwritten characters are deformed, and their patterns depend on individual handwriting habits.

In order to recognize handwritten characters subjected to deformation, it is utilized that local features are maintained in handwritten characters, and global features thereof are discriminated by induction on the basis of local features, thus effectively performing a top-down type technique.

The technique utilizing the top-down characteristics is to recognize an image by induction utilizing knowledge concerning an object to be recognized. In this sense, class classification can be effectively performed without matching all patterns of the image with the reference patterns.

The above-mentioned knowledge utilization introduces primitive patterns such as geometric features of characters, in particular, character parts associated with radicals of the Chinese characters, such as a left-hand radical, a right-hand radical, and an embracing radical for information recognition processing. Therefore, recognition efficiency can be improved.

A typical system of top-down characteristic utilization hardware is exemplified by an association memorization system utilizing an information processing algorithm inherent to a human brain. In recent years, extensive studies have been made to develop such a system.

However, in the conventional image recognition apparatus employing the bottom-up type technique described above, processing is performed employing mainly electronic techniques. Processing time is inevitably prolonged as follows:

In order to improve discrimination precision of the degree of similarity, features on a large number of axes must be extracted in feature extraction. However, in procedure (1), when the single feature-processing section is used to repeat feature extraction, the memory which stores the image information is scanned in predetermined directions to sequentially read out the image information from the memory. These informations are transferred to the feature-processing section and are measured as the measured values. The intensity distribution curve must be obtained on the basis of the measured values. Therefore, the above operation must be repeated to prolong the feature processing time, thus degrading efficiency of feature processing.

In procedure (2) wherein a large number of feature-processing sections are arranged and simultaneous processing is performed, the intensity distribution curves are obtained after the image information is transferred and measured. The feature processing time is prolonged, although procedure (2) is not worse than procedure (1). Procedure (2) requires a large number of feature-processing sections, and thus the overall system configuration is undesirably complicated and high cost.

In correlation calculations for discriminating the degree of similarity, processing time is prolonged in the same manner as in feature extraction. More specifically, the objects to be calculated are a large number of digital vector components. Discrimination of the degree of similarity between the input image and the reference pattern must be performed by repeating correlation calculations of a large number of vectors according to time-serial digital processing, in association with necessity for finding an optimal correlation.

In order to shorten the processing time, the above-mentioned special-purpose machinery for vector calculation is used. However, this special-purpose machinery depends on time-serial digital processing and does not essentially solve the problem of long processing time. In addition, a vector processor is built into such a special-purpose machinery. Therefore, the entire system consequently becomes highly costly.

In the conventional image recognition apparatus, the structural analysis by global feature extraction is primarily used. It is therefore difficult to sufficiently recognize an input image with many deformations such as handwritten characters.

Furthermore, although the top-down type image recognition apparatus aims at an increase in a recognition rate of handwritten characters with such deformations, a satisfactory apparatus is not yet available in practical applications. Therefore, the above-mentioned problems associated with recognition of images such as handwritten characters are left unsolved.

Development of special hardware is an indispensable requirement to realize a practical apparatus of this type. Many problems such as an economical problem as well as a problem associated with processing time are presented. In order to provide a practical model, the number of calculations must be reduced and approximation processing must be performed instead. However, in this case, analysis precision for handwritten characters with many deformations is undesirably degraded.

SUMMARY OF THE INVENTION

It is, therefore, an object of the present invention to provide a local feature analysis apparatus wherein, by introducing optical simultaneous processing into input image local feature extraction and correlation calculation processing, primitive patterns of the input image can be extracted and the degree of similarity can be serially discriminated with a simple arrangement at high speed.

A local feature analysis apparatus according to the present invention comprises: a display for displaying an input image serving as an object to be discriminated; first multiplying means for receiving light from the input image displayed on the display and multiplying light to form a plurality of optical pattern images of a substantially identical shape for local feature extraction; a plurality of first reference masks arranged near the plurality of optical pattern images from the first multiplying means in one-to-one correspondence therewith and respectively having various types of local features as reference patterns; first photodetecting means for simultaneously detecting lights respectively obtained through the plurality of first reference masks, the lights being obtained by optical correlation calculations between the plurality of optical pattern images and the various types of reference patterns of the plurality of first reference masks; a vector display for displaying an optical pattern image obtained by converting vectors corresponding to the local features extracted by the optical correlation calculations into an image; second multiplying means for multiplying the optical pattern image displayed on the vector display to obtain a plurality of optical pattern images of a substantially identical shape; a plurality of second reference masks respectively having various types of reference patterns subjected to matching with the plurality of optical pattern images from the second multiplying means, the plurality of optical pattern images from the second multiplying means being respectively guided to the plurality of second reference masks; and second photodetecting means for simultaneously detecting lights obtained by optical pattern matching through the plurality of second reference masks.

In the local feature analysis apparatus having the above arrangement according to the present invention, after the input image is displayed on the display, the plurality of optical pattern images of a substantially identical shape for local feature extraction are formed by the first multiplying means at a light propagation speed. At the same time, the plurality of first reference masks which respectively have the various types of local features in their reference patterns are simultaneously and optically correlated with the optical patterns from the first multiplying means. Lights respectively obtained in the simultaneous optical correlation calculations are simultaneously detected by the first photodetecting means at high speed. For this reason, the various types of local features included in the input image can be extracted substantially at the light propagation speed.

Vectors corresponding to combinations of the local features extracted by the optical correlation calculations are displayed as the optical pattern image on the vector display. The image displayed on the vector display is multiplied by the second multiplying means to obtain the plurality of optical pattern images of a substantially identical shape at the light propagation speed. The plurality of second reference masks respectively having the various types of reference patterns are simultaneously optically matched with the plurality of pattern images from the second multiplying means. The lights from the plurality of second reference masks which are obtained by simultaneous optical pattern matching are simultaneously detected by the second photodetecting means.

According to the present invention, formation of the plurality of optical patterns of a substantially identical shape for local feature extraction by the first multiplying means, simultaneous optical correlation calculations between the plurality of first reference masks respectively having local features to be extracted and the plurality of optical pattern images from the first multiplying means, simultaneous detection of the lights obtained by the optical correlation calculations of the first photodetecting means are performed substantially at the light propagation speed.

After the vectors as the combinations of the local features extracted by the optical correlation calculations are displayed as the optical pattern image on the vector display, multiplication of the optical pattern image by the second multiplying means, optical pattern matching between the plurality of second reference masks and the optical pattern images multiplied by the second multiplying means, and simultaneous detection of lights obtained by the optical pattern matching of the second photodetecting means can also be performed substantially at the light propagation speed.

In extraction processing of local features of the input image on the basis of the optical correlation calculations as well as analysis processing associated with combinations of the local features extracted on the basis of the optical pattern matching, the processing times therefor can be greatly shortened by optical simultaneous processing. Therefore, discriminations such as class classification of the image and image recognition can be performed at high speed.

Since feature extraction is performed on the basis of local features reliable against deformations and positional errors, the image having a standardized pattern and the image having a pattern with deformations and positional errors (e.g., a handwritten character) can be appropriately discriminated. Therefore, the range of image objects to be discriminated can be widened.

The apparatus comprises a combination of an image display system having the display and the vector display, an optical system having the first and second multiplying means, a mask system having the plurality of first and second reference masks, and a detection system having the first and second photodetecting means. In this sense, a higher packing density is not required. As compared with a conventional digital apparatus having an equivalent function, the apparatus according to the present invention can be simplified and inexpensive.

BRIEF DESCRIPTION OF THE DRAWINGS

FIGS. 1 to 10 show an embodiment wherein the present invention is applied to an image recognition apparatus, in which:

DETAILED DESCRIPTION OF THE PREFERRED EMBODIMENT

A preferred embodiment will be described with reference to the accompanying drawings in which the present invention is applied to an image recognition apparatus.

Figure 1:
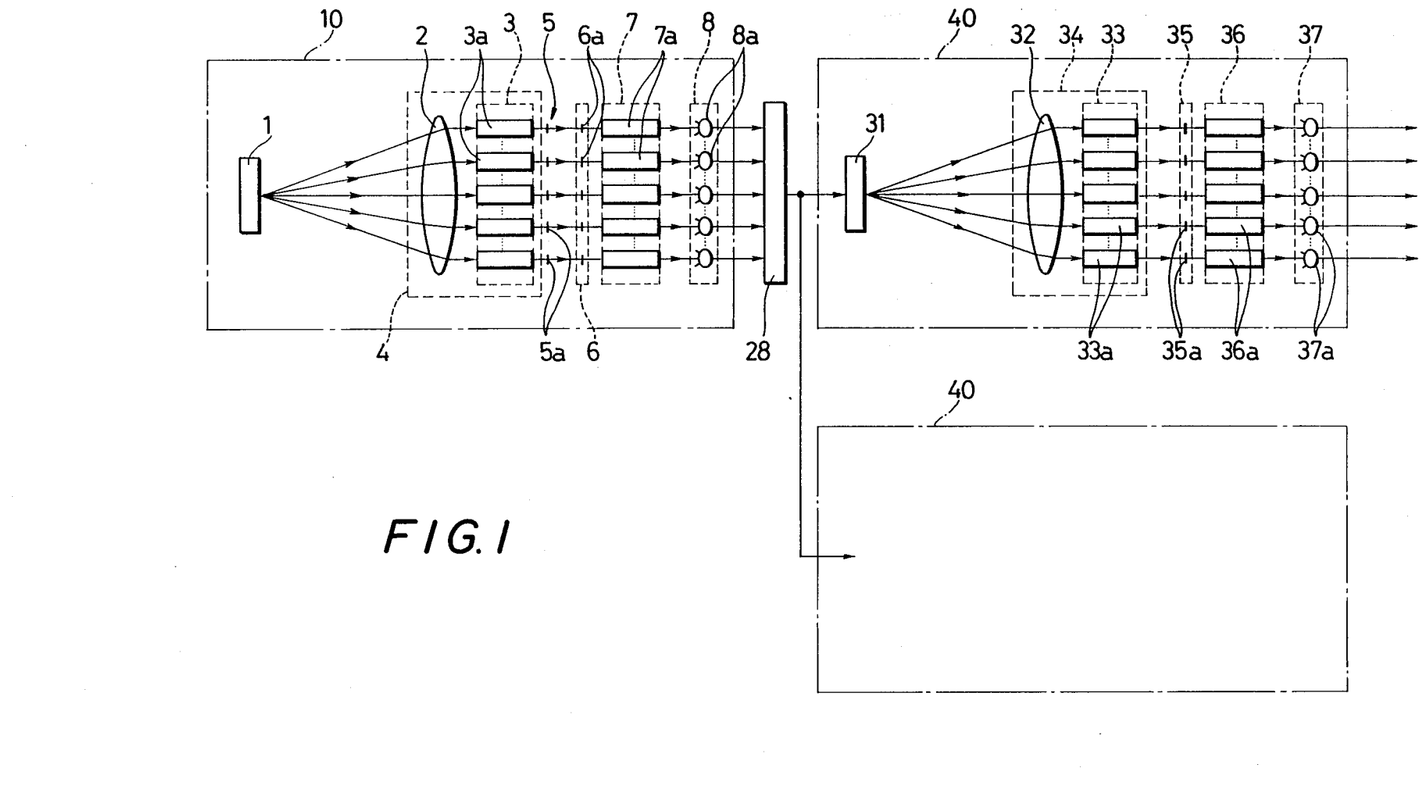
FIG. 1 is a schematic view of the apparatus of this embodiment.

Referring to FIG. 1, reference numeral 10 denotes a primitive pattern extractor. If an input image is composed of characters, local primitive patterns constituting a character pattern are simultaneously extracted by optical correlation calculations in the primitive pattern extractor 10.

An image pattern subjected to image recognition and described on an original by printing or the like is formed by an optical lens on a light-receiving surface of an image sensor comprising a CCD, MOS sensor or the like. A multi-value digital signal as image information is output from the image sensor. The multi-value digital signal is binarized by a proper threshold value (if a plurality of threshold values are used, multi-value conversion different from that described above), and the converted result is stored in a memory. The binary image information is preprocessed to shape the image. The preprocessed information is stored in the memory or another memory. This preprocessing includes noise reduction processing and normalization processing for positions, sizes, inclinations, and line widths.

The image information stored in the memory is read out and displayed as an optical input image on a screen of a display 1 such as a CRT or the like. In this embodiment, the input image is displayed as a negative image having a bright character portion and a dark background portion when the input image is a character image. The display may be an LED display with an LED emitting diffusing light as a light source or an LCD for impinging diffused light from the rear surface of a panel of a liquid crystal as a display medium.

A first projection lens 2 is located in front of the screen of the display 1 and is spaced apart therefrom by a focal length of the lens 2, as shown in FIG. 1. Therefore, light from the input image displayed on the screen of the display 1 is collimated by the first projection lens 2. The collimated beam from the first projection lens 2 is incident on a first lens array 3.

The first lens array 3 comprises a large number of image formation lenses 3a (several hundreds of lenses in this case) of gradient index microlenses. The first lens array 3 may be a plate microlens obtained by forming a large number of microlenses (e.g., gradient index lenses) in a plate made of glass or synthetic resin. The lens array 3 may be an SLA (trademark) available from Nippon Sheet Glass Co., Ltd. and prepared by bundling a large number of cylindrical gradient index lenses. In this case, a resin is filled between the cylindrical gradient index lenses such that they respectively correspond to positions of the image formation lenses 3a.

The first projection lens 2 and the first lens array 3 constitute a first multiplier 4. The input image formed on the screen of the display 1 and guided to the first lens array 3 through the projection lens 2 is multiplied by the image formation lenses 3a of the lens array 3 at positions in the vicinities of the focuses thereof. Therefore, optical pattern images 5a shown in FIGS. 3 to 5 are respectively and simultaneously formed on imaginary image formation planes 5 spaced from the end faces of the image formation lenses 3a by a distance $d_1$ shown in FIG. 2.

Figure 2:
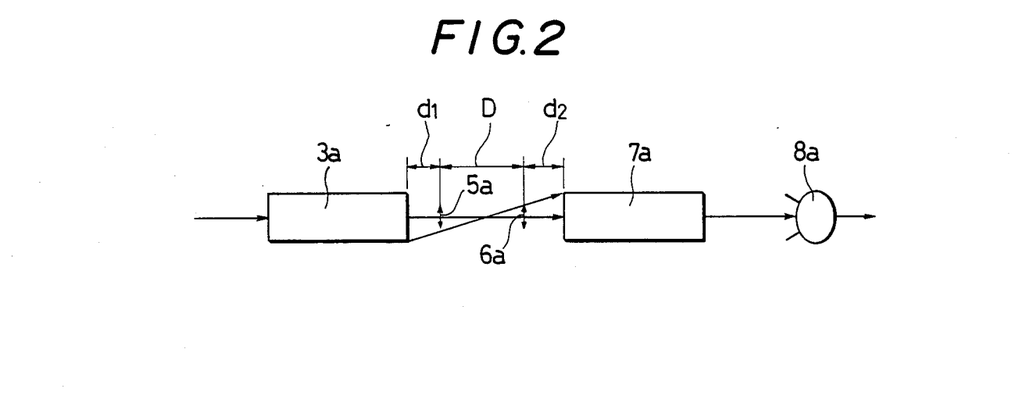
FIG. 2 is a schematic view of a main part of a primitive pattern extractor in the apparatus shown in FIG. 1.

A first mask array 6 is arranged in front of the image formation plane 5. The first mask array 6 comprises a large number of reference masks 6a aligned substantially on a plane. Since the reference masks 6a respectively have basic shape patterns or primitive patterns as being described later, the mask 6a are referred to as primitive masks hereinafter. The primitive masks 6a are arranged on the optical axis of the image formation lenses 3a in one-to-one correspondence therewith and are spaced apart from the image formation planes 5 by a predetermined distance D (FIG. 2).

Since the primitive masks 6a are located at positions spaced apart from the image formation planes 5 by the predetermined distance D, the optical pattern images 5a are projected on the primitive masks 6a in a diffused manner. In a manner to be described later, even if the optical pattern images 5a and the primitive patterns of the primitive masks 6a are not moved relative to each other along a direction perpendicular to the optical axis, optical correlation calculations between the optical pattern image and the primitive patterns can be performed.

Figure 3:
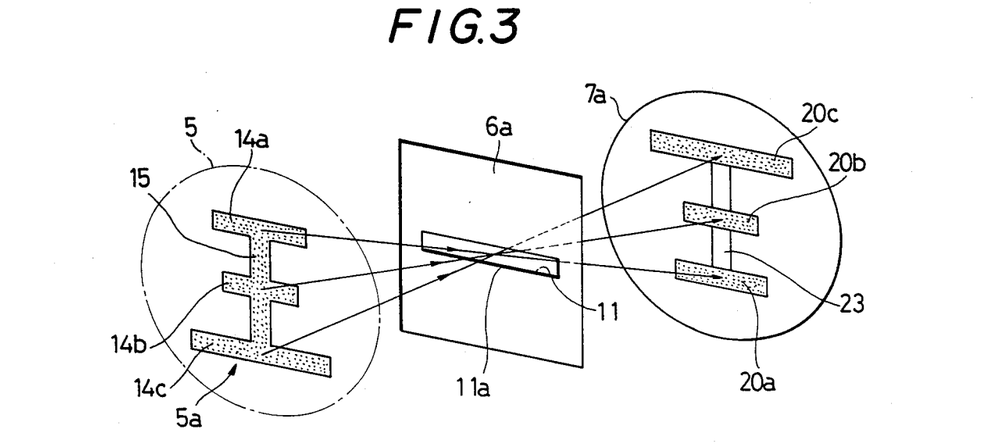
FIG. 3 is a schematic perspective view showing the relationship among an input image, a reference mask having a horizontal slit, and a condenser lens for explaining extraction of primitive patterns of the input image in the apparatus of FIG. 1.
Figure 4:
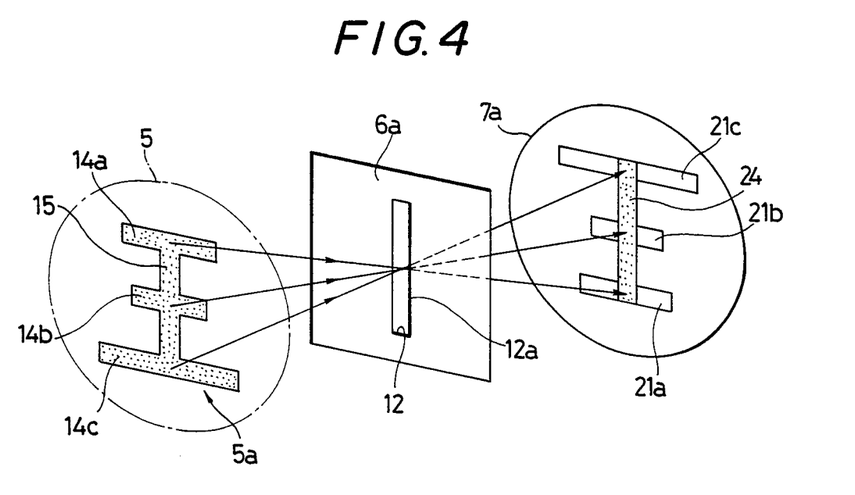
FIG. 4 is a schematic perspective view showing the relationship among an input image, a reference mask having a vertical slit, and a condenser lens for explaining extraction of primitive patterns of the input image in the apparatus of FIG. 1.
Figure 5:
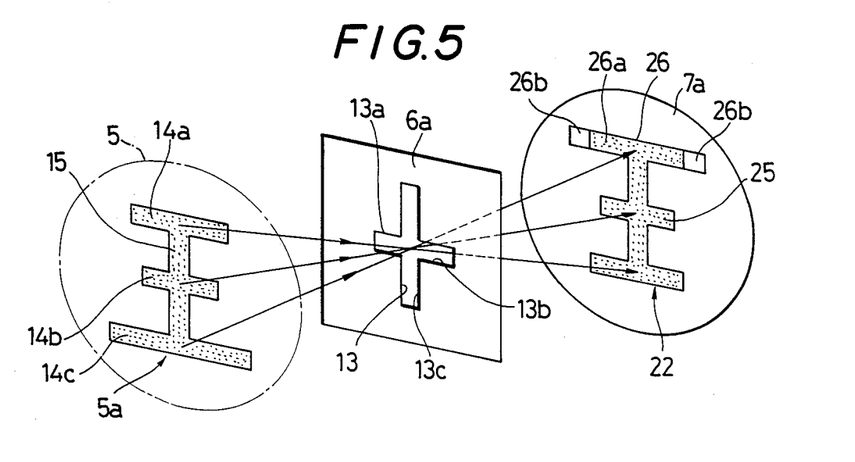
FIG. 5 is a schematic perspective view showing the relationship among an input image, a reference mask having a cross slit, and a condenser lens for explaining extraction of primitive patterns of the input image in the apparatus of FIG. 1.

As shown in FIGS. 3 to 5, primitive patterns 11a to 13a are formed on the primitive masks 6a, respectively. Each of patterns 11a to 13a comprises at least one of known basic shapes commonly included in a large number of input images. The lightness polarity of the primitive patterns 11a to 13a is the same as that of the input image.

When an object subjected to image recognition is a character, the primitive patterns may be radicals of Chinese characters (The radicals are used for the purpose of classifying and grouping Chinese characters in a dictionary written in the Japanese language for explaining the Chinese letters.), or parts or all of the constituting parts of characters similar to the radicals. The primitive pattern need not be constituted by a single basic shape. As shown in FIG. 5, the primitive pattern may be a simple combination of a plurality of basic shapes.

There are many primitive masks 6a (e.g., several tens of patterns) corresponding to the primitive patterns 11a to 13a required for extracting the basic shape patterns or the primitive patterns from a large number of input images. Referring to FIGS. 2 to 5, a large number of primitive masks 6a are separated. However, the primitive patterns 11a to 13a may be formed on a common mask substrate to constitute a large number of primitive masks 6a.

A second lens array 7 having a large number of condenser lenses 7a respectively corresponding to the primitive masks 6a is arranged in front of the mask array 6. The second lens array 7 may comprise a plate microlens or an SLA in the same manner as in the first lens array 3. Therefore, the beams passing through the primitive masks 6a are condensed by the corresponding condenser lenses 7a and are guided to a first photosensor array 8.

The first photosensor array 8 comprises a large number of photosensors 8a arranged in the vicinities of the condensing points of the condenser lenses 7a in one-to-one correspondence therewith. The beams passing through the primitive masks 6a are respectively condensed by the condenser lenses 7a, and the intensities of these beams are detected by the corresponding photosensors 8a.

In this case, an output from the photosensor 8a for an optical pattern image 5a having one (extending along the overall width of the display 1) of the basic shapes constituting the primitive pattern formed on the primitive mask 6a is used as a reference value. If an output from the photosensor 8a corresponding to a primitive pattern upon detection of any input image is compared with the reference value, the number of the primitive patterns included in the input image can be discriminated.

Feature extraction in the primitive pattern extractor 10 in FIG. 1 will be described in detail with reference to FIGS. 2 to 5.

Referring to FIG. 2, the image formation lens 3a comprises a gradient index lens, as described above. The collimated beam incident from the projection lens 2 to the image formation lens 3a propagates in the image formation lens 3a in a zigzag manner along the optical axis and is output from the end face of the lens 3a. The optical pattern 5a is formed at a position of the imaginary image formation plane 5.

As is apparent from FIG. 2, the input image is focused as scattered light on the primitive pattern mask 6a.

The predetermined distance D is illustrated to be relatively long in FIGS. 1 and 2. However, the predetermined distance D is short in practice. The corresponding condenser lens 7a is located at a position spaced apart from the primitive mask 6a by a distance $d_2$.

In this manner, in the case shown in FIGS. 1 and 2, since the predetermined distance D is assured, lights from all points of the optical pattern image 5a are incident on all points of the primitive mask 6a. For this reason, correlation calculations can be instantaneously performed on the primitive mask 6a in the same manner as in the case wherein the input image is continuously shifted with respect to the primitive patterns 11a to 13a by a predetermined shift amount. Therefore, optical correlation calculations between the primitive masks 6a and the input image can be instantaneously performed.

The predetermined distance D must be determined to allow instantaneous optical correlation calculations between the primitive masks 6a and the input image. In order to satisfy the above requirement, the predetermined distance D is preferably a value of D or near this value wherein the lights from all points of the optical pattern image 5a are initially incident upon all points of the primitive patterns 11a to 13a of the primitive mask 6a when the value of D is gradually increased from zero. If the size (e.g., a height of the mask 6a) of the primitive mask 6a, the focal length of the condenser lens 7a, and the height of the image of the primitive mask 6a formed on the photosensor 8a are defined as Ym, $f_1$, and Ym', respectively, the following equation is approximated:

$$Ym/D = Ym'/f_1$$

If the heights Ym and Ym' and the focal length $f_1$ are given to be about 500 μm and 500 μm or less, and several millimeters, respectively, the predetermined distance D can be set to be several millimeters.

The relationship between the optical pattern image 5a, the primitive mask 6a and the condenser lens 7a will be described with reference to FIGS. 3 to 5.

Referring to FIGS. 3 to 5, an input image represents Chinese character "三". In the case of FIG. 3, the primitive pattern formed on the primitive mask 6a comprises a light-transmitting horizontal slit 11 having a predetermined width substantially at the center of the mask 6a. In this case, lights from three horizontal parallel line segments 14a, 14b, and 14c of the optical pattern image 5a pass without any change through the horizontal slit 11. The passing lights are projected as an inverted image on the condenser lens 7a. Therefore, three brighter parts 20a, 20b, and 20c are formed on the light-receiving surface of the lens 7a.

One vertical line segment 15 of the optical pattern image 5a is substantially perpendicular to the horizontal slit 11. For the reason, one darker part 23 is formed on the light-receiving surface of the condenser lens 7a. Therefore, an output from the corresponding photosensor 8a allows detection that the input image has three horizontal line segments 14a, 14b, and 14c or equivalent horizontal line segments.

The primitive pattern 12a shown in FIG. 4 comprises a light-transmitting vertical slit 12 extending at a predetermined width substantially at the center of the mask 6a. In this case, unlike in the case of FIG. 3, three darker parts 21a, 21b, and 21c and one brighter part 24 are formed on the light-receiving surface of the condenser lens 7a. An output from the corresponding photosensor 8a allows detection that the input image has one vertical line segment 15 or equivalent vertical line segments.

In the case of FIG. 5, the primitive pattern 13a formed on the primitive mask 6a comprises a cross-shaped slit 13 formed substantially at the center of the mask 6a. A horizontal portion 13b of the cross-shaped slit 13 is shorter than the horizontal slit 11 (FIG. 3).

As shown in FIG. 5, a cross-shaped projected part 25 is formed on the light-receiving surface of the lens 7a through the cross-shaped slit 13. A brighter part 22 is formed on the light-receiving surface of the lens 7a in correspondence with the horizontal line segment 14a of the optical pattern image 5a.

However, since a horizontal portion 13b of the cross-shaped slit 13 is short, the central part 26a corresponding to the long horizontal line segment 14c of the pattern is a brighter part, and end parts 26b are darker parts, thus forming a horizontal projected part 26 on the light-receiving surface of the lens 7a.

The input image is recognized to have about one or two cross-shaped primitive patterns on the basis of the reference value corresponding to the cross-shaped primitive pattern in response to the output from the photosensor 8a.

In each case of FIGS. 3 to 5, when the light-receiving surface of the condenser lens 7a comes closer to the primitive mask 6a, the image projected on the light-receiving surface of the lens 7a is narrowed in the vertical direction (FIG. 3), in the horizontal direction (FIG. 4), and in both the vertical and horizontal directions (FIG. 5).

As is apparent from the above description, when the distance $d_2$ between the primitive mask 6a and the image formation plane (i.e., the light-receiving surface of the lens 7a) is properly selected, a projected image having a proper spread function can be formed.

In the primitive pattern extractor 10 for extracting the patterns shown in FIGS. 3 to 5, the input pattern as the input image comprises a relatively simple character "王". However, the primitive patterns may be extracted for other characters having complicated patterns in the same manner as described above.

In this case, the primitive patterns formed on the primitive masks 6a may include a T-shaped slit, an oblique slit, a loop slit (e.g., a circular or rectangular slit), and a radial slit in addition to the horizontal, vertical, and cross-shaped slits 11, 12, and 13 respectively shown in FIGS. 3 to 5. By using primitive masks 6a having these slits, one or more primitive patterns of the horizontal, vertical, cross, oblique, circumferential, and radial components of the input image can be extracted.

When the primitive patterns included in the input image are extracted by the primitive pattern extractor 10, discrete photosensor outputs from the plurality of photosensors 8a are output to a register and display driver 28 (to be described later).

The various types of primitive patterns correspond to one multi-dimensional vector. In other words, the plurality of photosensor outputs are ordered in correspondence with the vector components. The plurality of photosensor outputs are measured on the basis of the reference values of the photosensors 8a and correspond to the magnitudes of the vectors.

The following table shows data obtained when primitive patterns of input Chinese characters "王", "明" and "木" are extracted as horizontal, vertical, cross, and oblique (line segments inclined from the upper right corner to the lower left corner and from the upper left corner to the lower right corner) components, and the rough numbers of extracted components are summarized.

TABLE

| Primitive Pattern | Input Character | | |
|---|---|---|---|
| | 王 | 明 | 木 |
| Horizontal Component (−) | 3 | 5 to 6 | 1 |
| Vertical Component (\|) | 1 | 3 to 4 | 1 |
| Cross Component (+) | 1 to 2 | 2 to 3 | 1 |
| Oblique Component (/) | 0 | 0 | 1 |
| Oblique Component (\) | 0 | 0 | 1 |

The horizontal component, the vertical component, the cross component, the oblique component inclined toward the lower left corner, and the oblique component inclined toward the lower right corner correspond to vector components x1, x2, x3, x4 and x5, respectively. The primitive patterns of the input character correspond to a 5-dimensional vector $\vec{x}=(x1, x2, x3, x4, x5)$. The magnitudes of the vector components correspond to data listed in the above table. The vector corresponding to Chinese character "王" is $\vec{x}=(3, 1, 1.5, 0, 0)$.

Figure 6:
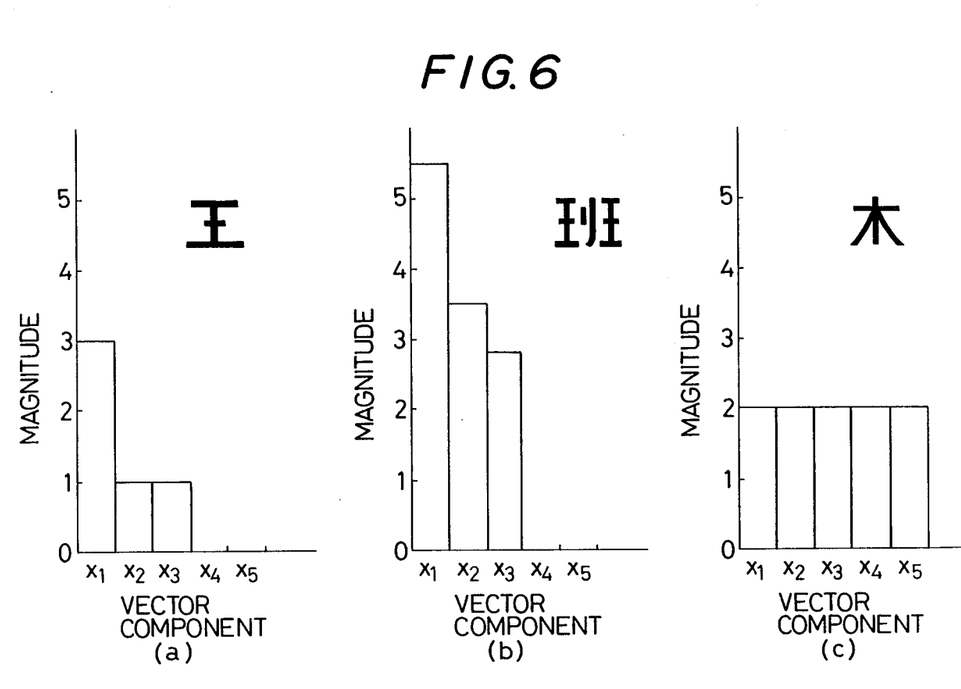
FIGS. 6(a) to 6(c) are respectively graphs showing the relationships between the vector components and the vector magnitudes for explaining conversion to vectors of various types of primitive patterns concerning Chinese characters "王", "助", and "木" extracted by the primitive pattern extractor in the apparatus shown in FIG. 1.

FIGS. 6(a) to 6(c) are graphs showing magnitudes as a function of the vector components of the primitive patterns of input characters "王", "明" " ", respectively.

The number of primitive patterns extracted through the primitive masks 6a is not given as an integer but a decimal when the input character pattern is complicated. For this reason, an extraction effect of primitive patterns is degraded.

If an input character having a complicated pattern is taken into consideration, a large number of primitive masks instead of the above-mentioned five primitive masks 6a are prepared, and local features extracted in units of characters must be discriminated from each other.

According to the primitive pattern extractor 10 having the arrangement described above, after the input image is displayed on the display 1, multiplication of the input image by means of the first multiplier 4, optical correlation calculations between the multiple images and the various types of primitive patterns 11a to 13a, and condensing of light from the primitive mask 6a by means of the condenser lens 7a can be instantaneously performed at the light propagation time. The condensed lights can be simultaneously detected by a large number of photosensors 8a at high response speed. Primitive pattern extraction by an optical correlation calculation between the input image (an unknown pattern) and a primitive pattern (a known pattern) of the primitive mask can be simultaneously performed at high speed.

In the above embodiment, the primitive patterns 11a to 13a of the primitive mask 6a have predetermined shapes which are not changed to other shapes. However, the primitive patterns 11a to 13a may be constituted by a spatial modulation element.

In this case, the spatial modulation element using a liquid crystal as a display medium is used as the primitive mask 6a. Reference data corresponding to each primitive pattern is stored in a data base. The reference data is transferred from the data base to the spatial modulation element as needed. Various types of primitive patterns corresponding to reference data can be formed by the spatial modulation element.

When the primitive masks 6a are constituted as variable masks by using spatial modulation element, the desired primitive patterns can be sequentially patterned by the spatial modulation element upon readout of reference data from a data base. Optical correlation calculations between the readout patterns and the input image patterns are sequentially performed.

In the above embodiment, the line width of the optical pattern image 5a formed on the image formation plane 5 is substantially the same as those of the primitive patterns 11a to 13a. However, the line width of the optical pattern image 5a may be different from those of the primitive patterns 11a to 13a. For example, the line widths of the primitive patterns 11a to 13a may be slightly larger than those of the optical pattern image 5a.

In the above embodiment, the photodetecting means comprise photosensors 8a having photoelectric conversion functions, and the lights condensed by the condenser lenses 7a are directly guided to the photosensors 8a respectively. However, the light of each condenser lens 7a may be guided to another primitive mask, and the light from this primitive mask may be detected by a photosensor or the like.

In the above embodiment, the first lens array 3 is separated from the first mask array 6, and the imaginary image formation plane 5 exists therebetween. However, the first lens array 3 and the first mask array 6 may be integrally formed. More specifically, the first lens array 3 and the first mask array 6 may be arranged in a common cylinder at various axial positions. Alternatively, the individual image formation lenses 3a may be paired with the individual primitive masks 6a, and the pairs may be bundled.

Furthermore, the optical pattern image 5a may be formed on the output end face of the image formation lens 3a constituting the first lens array 3 or inside the lens at a position spaced apart from the output end face. At the same time, the primitive mask 6a may be brought into direct contact with the output end face.

In the above embodiment, if the primitive mask 6a comes close to the photosensor 8a, the condenser lens 7a may be omitted.

As described above, when photosensor outputs corresponding to the primitive patterns in the real space inherent to the input image are output from the photosensors 8a in the primitive pattern extractor 10, these outputs are displayed as an optical pattern corresponding to the vectors on the vector display 31 in the vector discriminator 40 under the display control of the register and display driver 28.

The vector discriminator 40 performs correlation calculations between the various types of reference patterns and the optical patterns converted from vectors corresponding to the various types of primitive patterns included in the input image in accordance with simultaneous optical pattern matching. The number of primitive patterns of input character " 王 " is limited to five as listed in the table in the following description.

As shown in FIG. 6(a), the five-dimensional vector corresponding to input character " 王 " consists of five vector components x1 to x5 corresponding to five primitive patterns, i.e., the horizontal component, the vertical component, the cross component, the oblique component inclined toward the lower left corner, and the oblique component inclined toward the lower right corner. The five vector components x1 to x5 are displayed as bright line patterns on the vector display 31 under the control of the register and display driver 28.

Figure 7:
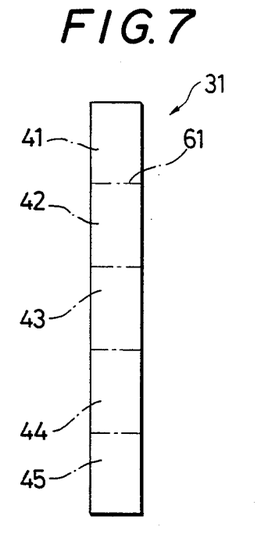
FIG. 7 is a front view of the vector display (FIG. 1) showing display areas assigned to the vector components corresponding to the various types of primitive patterns shown in FIG. 6(a)

A large number of discrete photosensor outputs obtained by extraction of the primitive patterns are displayed as a large number of bright line patterns on the vector display 31 in FIG. 1. For this reason, as indicated by an alternate long and short dashed line 61 in FIGS. 7 and 8, a predetermined number of rectangular areas 41 to 45 corresponding to the vector components x1 to x5 are assigned on the display screen of the vector display 31.

Figure 8:
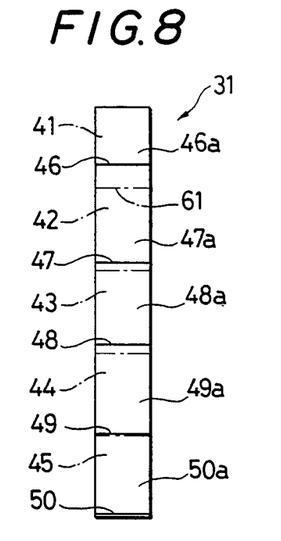
FIG. 8 is a front view of the vector display (FIG. 1) showing a state wherein vectors corresponding to the various types of primitive patterns associated with Chinese character "エ" are displayed as bright line patterns.

As shown in FIG. 8, the vector components are displayed as bright lines 46 to 50 at positions proportional to the magnitudes of the vector components in the areas 41 to 45. Since the bright lines 46 to 50 are respectively displayed in the areas 41 to 45, the bright line patterns 46a to 50a as the optical patterns corresponding to the vector are formed.

The photosensor outputs corresponding to the primitive patterns of input character " 王 " shown in FIG. 6(a) are converted into the five-dimensional vector $\vec{x}$ on the vector display 31.

In the above embodiment, a maximum value of the vector components corresponding to the primitive patterns extracted by the primitive masks 6a is set to be 10. As described above, since x1=3, x2=1, x3=1.5, x4=0 and x5=0, then (3, 1, 1.5, 0, 0). Therefore, the vector components are displayed as the bright lines 46 to 50 at positions in correspondence with their magnitudes within the total range of 0 to 10 in the areas 41 to 45.

The bright line pattern group as a set of bright line patterns 46a to 50a corresponds to the primitive patterns extracted from the input image.

The vector discriminator 40 shown in FIG. 1 will be described below. A second projection lens 32 is spaced apart from the front surface of the vector display 31 by a focal length of the second projection lens 32. Lights from the bright line pattern group displayed on the display screen of the vector display 31 are collimated by the second projection lens 32. The collimated lights are guided to a third lens array 33. The third lens array 33 may comprise a plate microlens or an SLA in the same manner as in the first lens array 3.

The second projection lens 32 and the third lens array 33 constitutes a second multiplier 34 for optically multiplying the bright line pattern group. Therefore, the second multiplier 34 may be arranged substantially the same as the first multiplier 4. The bright pattern group displayed on the vector display 31 and guided to the second lens array 33 through the second projection lens 32 is focused on second reference marks 35a by corresponding image formation lenses 33a.

Figure 9:
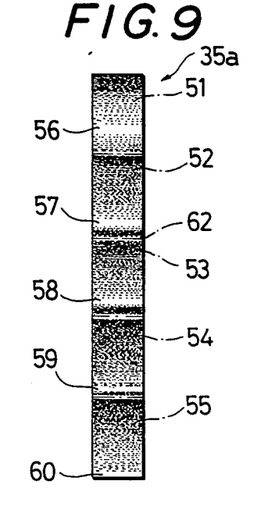
FIG. 9 is a front view of reference masks (FIG. 1) having reference patterns corresponding to the bright line patterns of Chinese character "エ" (FIG. 8)

The reference mask 35a has predetermined rectangular areas 51 to 55 corresponding to the areas 41 to 45 of the vector display 31, and indicated by an alternative long and short dashed line 62 in FIG. 9. Reference patterns 56 to 60 having an intensity polarity same as that of the bright line patterns 46a to 50a are formed in the areas 51 to 55, respectively. The size of the areas 51 to 55 of the reference mask 35a may be the same as or different from that of the areas 41 to 45 of the vector display 31. Essentially, the bright line patterns 46a to 50a are formed on the reference patterns 56 to 60 by the second multiplier 34 such that one-to-one correspondence between the areas 41 to 45 of the display 31 and the areas 51 to 55 of the reference mask 35a is established.

Various kinds of reference masks, the number of which is the number of discrimination operations such as class classification and recognition, are used as the reference masks 35a. The plurality of reference masks 35a constitute the second mask array 35 with masked vectors serving as the index of various characters. The reference mask 35a shown in FIG. 9 has the reference patterns 56 to 60 corresponding to the bright line patterns 46a to 50a of Chinese character " 王 " shown in FIG. 8 and are used to recognize Chinese character " 王 ".

The reference patterns 56 to 60 serve as a gray scale because the concept of so-called "blurring" is introduced. Even if a character to be discriminated is a printed Chinese character, the printed Chinese character has many forms, and deformations and positional errors often occur in a case of a handwritten Chinese character. Unless the reference patterns 56 to 60 serve as the gray scale, it is difficult to establish pattern matching between the bright line patterns 46a to 50a corresponding to the character to be discriminated and the reference patterns 56 to 60 corresponding to the character.

However, in this embodiment, since the reference patterns 56 to 60 constitute the gray scale, pattern matching adaptive for styles of characters and positional errors to some extent can be performed.

The bright line patterns 46a to 50a displayed on the vector display 31 are formed on a plurality of reference masks 35a by the second multiplier 34, respectively. In this case, image formation is performed such that one-to-one correspondence between the areas 41 to 45 of the vector display 31 and the areas 51 to 55 of the reference mask 35a is established.

The lights passing through the reference masks 35a are focused by a large number of condenser lenses 36a of the fourth lens array 36 located in one-to-one correspondence with the reference masks 35a. The focused lights are then guided onto the second photosensor array 37. The fourth lens array 36 has the same arrangement as that of the second lens array 7.

The second photosensor array 37 comprises a large number of photosensors 37a arranged in one-to-one correspondence with the condenser lenses 36a and located near the focal points of the condenser lenses 36a. The light passing through the reference mask 35a is focused by the condenser lens 36a, and the intensity of this light is detected by the photosensor 37a. In this case, when the intensity of the light detected by the photosensor 37a is near the normalized intensity, this reference mask 35a matches well with the bright line patterns 46a to 50a of the image to be discriminated.

Outputs from the photosensors 37a are normalized in units of reference masks 35a according to the maximum intensity of the light passing through the reference mask 35a in order to make image discrimination easy. The levels of the normalized outputs are compared with each other in a maximum value detector (not shown), and the reference mask 35a giving the maximum output is discriminated. By this discrimination result, class classification or recognition of the image to be discriminated is performed.

A peak detector is additionally arranged in the maximum value detector, and only sensor output levels exceeding a threshold value of the peak detector are compared to reduce the number of sensor outputs to be compared.

In the vector discriminator 40 having the arrangement, after the bright line patterns 46a to 50a as two-dimensional optical patterns representing the vector components corresponding to the primitive patterns are displayed on the vector display 31, multiplication of the bright line patterns 46a to 50a, optical matching between the multiplied bright line patterns 46a to 50a and the reference patterns, and focusing of the light passing through the reference mask 35a by means of the condenser lens 36a can be performed at a light propagation speed. The focused lights can be simultaneously detected by the large number of photosensors 37a in high response time.

Figure 10:
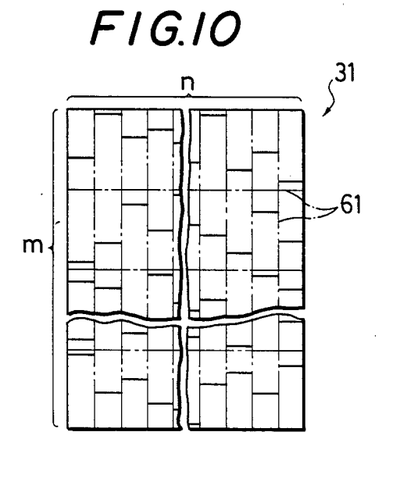
FIG. 10 is a partial front view showing a state wherein the vector display displays bright light patterns in the m×n areas of the screen.

In the above embodiment, the vector discriminator 40 processes 5×1 vector components. However, in general, the number of vector components may be m×n (each of m and n is a natural number), as shown in FIG. 10. When primitive masks 6a respectively corresponding to m×n primitive patterns are arranged to extract the m×n primitive patterns of the input image, m×n bright line patterns are formed on the vector display 31. Therefore, a bright line pattern group corresponds to a m×n dimensional vector. Conditions m=1 and n=1 may be given. In this case, the bright line pattern corresponds to a one-dimensional vector.

In the above embodiment, the areas respectively corresponding to the vector components are formed on the vector display 31, and the bright line patterns corresponding to the vector component are displayed in the areas, respectively. However, the plurality of bright line patterns may be simultaneously displayed in the areas, respectively. For example, each two of the bright line patterns are displayed in a corresponding one of the areas, thereby displaying the bright line patterns.

The primitive mask (reference mask) 35a used in the vector discriminator 40 may be a fixed mask or a variable mask constituted by spatial modulation elements in the same manner as the reference mask 6a used in the primitive pattern extractor 10.

In the above embodiment, the intensity polarity of the reference pattern of the reference mask 35a is the same as that of the bright line patterns displayed on the vector display 31. However, the opposite polarities may be employed. The optical pattern displayed on the vector display 31 is a bright line pattern. However, the optical pattern may be a light spot corresponding to a primitive pattern to be extracted. In this case, for example, one primitive pattern corresponds to one light spot formed at a position corresponding to the number of extracted patterns (i.e., the magnitude of the vector component).

In the above embodiment, a total amount of light passing through the large number of reference patterns of one reference mask 35a is detected by the single photosensor 37a. However, the amounts of lights passing through the individual reference patterns of the primitive masks 35a may be independently detected by separate photosensors. In the above embodiment, the light passing through the reference mask 35a is detected. However, light reflected or absorbed by each reference mask 35a may be detected.

In the above embodiment, a proper space is formed between the third lens array 33 and the second mask array 35. However, the third lens array 33 and the second mask array 35 may be integrally formed in the same manner as in the first lens array 3 and the first mask array 6.

If a very large number of primitive masks 35a are used, vector discriminators 40 are arranged in parallel to each other, as shown in FIG. 1, and the discriminators 40 have a plurality of mask arrays 35. In other words, the reference mask data base may be divided into sections which are respectively assigned to the discriminators 40, thereby achieving simultaneous processing.

In the above embodiment, images to be recognized include alphanumeric symbols (i.e., letters and Arabic numerals), Japanese hiragana characters, Japanese katakana characters, and Chinese characters. In this case, characters may be printed characters of a Gothic type, a Ming type or the like or may be handwritten characters. The present invention can also be applied to class classification and recognition of various types of information such as figures.

What is claimed is:

1. A local feature analysis apparatus comprising:
   a display for displaying an input image serving as an object to be discriminated;
   first multiplying means for receiving light from the input image displayed on said display and multiplying light to form a plurality of optical pattern images of a substantially identical shape for local feature extraction;
   a plurality of first reference masks arranged at a position spaced by a predetermined distance apart from an image formation plane of the plurality of optical pattern images from said first multiplying means in one-to-one correspondence therewith and respectively having various types of local features as reference patterns;
   first photodetecting means for simultaneously detecting lights respectively obtained through said plurality of first reference masks, the lights being obtained by optical correlation calculations between the plurality of optical pattern images and said various types of reference patterns of said plurality of first reference masks;

wherein the local features of the input image are extracted by the optical correlation calculations between the plurality of optical pattern images from said first multiplying means and said plurality of first reference masks;

a vector display having a plurality of display areas each of which corresponds to one or more components of vector corresponding to the local features extracted by the optical correlation calculations, and displaying an optical pattern image obtained by converting said vector into an image such that said components are displayed as bright lines or light spots at positions corresponding to magnitudes thereof in said display areas;

second multiplying means for multiplying the optical pattern image displayed on said vector display to obtain a plurality of optical pattern images of a substantially identical shape;

a plurality of second reference masks respectively having various types of reference patterns subjected to matching with the plurality of optical pattern images from said second multiplying means, the plurality of optical pattern images from said second multiplying means being respectively guided to said plurality of second reference masks; and second photodetecting means for simultaneously detecting lights obtained by optical pattern matching through said plurality of second reference masks.

2. An apparatus according to claim 1, further comprising:

an image sensor for detecting the input image; and preprocessing means for preprocessing an image signal from said image sensor so as to shape the input image, the image signal preprocessed by said preprocessing means being transmitted to said display.

3. An apparatus according claim 1, wherein the reference patterns of one of said plurality of first and second reference masks have predetermined shapes which are not changed to other shapes.

4. An apparatus according to claim 1, wherein the reference patterns of one of said plurality of first and second reference masks are formed by a spatial modulation element so as to cause the reference patterns to change in various types.

5. An apparatus according to claim 1, wherein said first multiplying means comprises a projection lens spaced by a focal length thereof from a position of the input image displayed on said display, and a plurality of image formation lenses arranged in one-to-one correspondence with said plurality of first reference masks, said image formation lenses being adapted to receive collimated light from said projection lens and supply the plurality of optical pattern images of a substantially identical shape of said first multiplying means to said plurality of first reference masks.

6. An apparatus according to claim 1, wherein said second multiplying means comprises a projection lens spaced by a focal length thereof apart from a position of the plurality of optical pattern images displayed on said vector display, and a plurality of image formation lenses arranged in one-to-one correspondence with said plurality of second reference masks, said image formation lenses of said second multiplying means being adapted to receive collimated light from said projection lens of said second multiplying means and supply the plurality of optical pattern images from said second multiplying means to said plurality of second reference masks.

7. An apparatus according to claim 1, wherein the reference patterns formed in said plurality of second reference masks are constituted as a gray scale.

8. A local feature analysis apparatus comprising:

a display for displaying an input image serving as an object to be discriminated;

first multiplying means for receiving light from the input image displayed on said display and multiplying light to form a plurality of optical pattern images of a substantially identical shape for local feature extraction;

a plurality of first reference masks arranged at a position spaced by a predetermined distance apart from an image formation plane of the plurality of optical pattern images from said first multiplying means in one-to-one correspondence therewith and respectively having various types of local features as reference patterns;

first photodetecting means for simultaneously detecting lights respectively obtained through said plurality of first reference masks, the lights being obtained by optical correlation calculations between the plurality of optical pattern images and said various types of reference patterns of said plurality of first reference masks;

wherein the local features of the input image are extracted by the optical correlation calculations between the plurality of optical pattern images from said first multiplying means and said plurality of first reference masks;

a vector display for displaying an optical pattern image obtained by converting vectors corresponding to the local features extracted by the optical correlation calculations into an image;

second multiplying means for multiplying the optical pattern image displayed on said vector display to obtain a plurality of optical pattern images of a substantially identical shape;

a plurality of second reference masks respectively having various types of reference patterns subjected to matching with the plurality of optical pattern images from said second multiplying means, the plurality of optical pattern images from said second multiplying means respectively guided to said plurality of second reference masks;

second photodetecting means for simultaneously detecting lights obtained by optical pattern matching through said plurality of second reference masks; and display control means for receiving data of the local features output from said first photodetecting means and controlling such that predetermined optical pattern images are displayed at positions corresponding to magnitudes of the data of the local features on a screen of said vector display.

* * * * *

UNITED STATES PATENT AND TRADEMARK OFFICE
CERTIFICATE OF CORRECTION

PATENT NO. : 4,862,511

DATED : August 29, 1989

INVENTOR(S) : Peppers et al.

It is certified that error appears in the above-identified patent and that said Letters Patent is hereby corrected as shown below:

Column 13, line 57, please insert the character "$\vec{x}$"= before "3,1,1.5,0,0). Therefore"

Column 14, line 17, please change the word "and" to --as--.

Signed and Sealed this

Thirty-first Day of July, 1990

Attest:

HARRY F. MANBECK, JR.

Attesting Officer      Commissioner of Patents and Trademarks